United States Patent
Fogle, Jr.

(10) Patent No.: US 6,565,119 B2
(45) Date of Patent: May 20, 2003

(54) VEHICLE OCCUPANT SAFETY APPARATUS WITH RESTRAINT COMMUNICATION BUS AND TRANSFORMER CONNECTIONS

(75) Inventor: Homer W. Fogle, Jr., Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/903,234

(22) Filed: Jul. 11, 2001

(65) Prior Publication Data

US 2003/0011179 A1 Jan. 16, 2003

(51) Int. Cl.[7] .............................................. B60R 21/32
(52) U.S. Cl. .......................................... 280/735; 701/45
(58) Field of Search ............................. 280/735; 701/45

(56) References Cited

U.S. PATENT DOCUMENTS

| | | | |
|---|---|---|---|
| 3,995,209 A | 11/1976 | Weston | 323/44 R |
| 4,141,297 A | 2/1979 | Sellwood | 102/206 |
| 4,297,947 A | 11/1981 | Jones et al. | 361/248 |
| 4,422,378 A | 12/1983 | Plichta | 102/206 |
| 4,422,379 A | 12/1983 | Geller et al. | 102/206 |
| 4,685,395 A | 8/1987 | King | 102/202.2 |
| 4,768,127 A | 8/1988 | Desrochers | 361/251 |
| 5,052,941 A | 10/1991 | Hernandez-Marti et al. | 439/194 |
| 5,325,046 A | 6/1994 | Young et al. | 323/356 |
| 5,432,486 A | 7/1995 | Wong | 333/109 |
| 5,506,454 A * | 4/1996 | Hanzawa et al. | 180/272 |
| 5,520,114 A | 5/1996 | Guimard et al. | 102/215 |
| 5,646,454 A * | 7/1997 | Mattes et al. | 180/282 |
| 5,725,242 A * | 3/1998 | Belau et al. | 102/202.5 |
| 5,799,972 A | 9/1998 | Handman et al. | 280/735 |
| 5,856,710 A * | 1/1999 | Baughman et al. | 280/735 |
| 5,899,949 A * | 5/1999 | Kincaid | 180/268 |
| 5,909,100 A | 6/1999 | Watanabe et al. | 320/108 |
| 5,912,428 A | 6/1999 | Patti | 102/215 |
| 5,929,368 A | 7/1999 | Ewick et al. | 102/215 |
| 5,964,816 A * | 10/1999 | Kincaid | 180/271 |
| 5,969,432 A * | 10/1999 | Zabler et al. | 180/280 |
| 6,012,736 A * | 1/2000 | Hansen et al. | 280/731 |
| 6,293,582 B1 * | 9/2001 | Lewis | 244/121 |

* cited by examiner

Primary Examiner—Lesley D. Morris
Assistant Examiner—L. Lum
(74) Attorney, Agent, or Firm—Tarolli, Sundheim, Covell & Tummino L.L.P.

(57) ABSTRACT

A vehicle occupant safety apparatus (10) comprises a sensor (12) for sensing a vehicle crash condition and a control module (14) for receiving a signal from the sensor (12) and generating a demand-to-fire signal if the crash condition is above a threshold level. The apparatus (10) further comprises a plurality of restraint modules (20) for, when actuated, helping to protect a vehicle occupant. Each restraint module (20) has at least one initiator (22) that is energizable to actuate the restraint module (20). A restraint communication bus (58) transfers the demand-to-fire signal from the control module (14) to the restraint modules (20). A connector (66) is associated with each initiator (22). Each initiator (22) and the associated connector (66) collectively form a transformer (80). The demand-to-fire signal is inductively coupled to the initiator (22) for actuating the restraint module (20).

15 Claims, 3 Drawing Sheets

VEHICLE OCCUPANT SAFETY APPARATUS WITH RESTRAINT COMMUNICATION BUS AND TRANSFORMER CONNECTIONS

TECHNICAL FIELD

The present invention relates to a vehicle occupant safety apparatus and, more particularly, to a vehicle occupant safety apparatus having an actuatable restraint module.

BACKGROUND OF THE INVENTION

A known vehicle occupant safety apparatus includes a plurality of actuatable restraint modules. Each restraint module includes an initiator that is energizable to actuate the restraint module. The initiator includes two pins that extend outwardly from a main body portion of the initiator. A connector is associated with each initiator. The connector includes two receptacles, each sized for receiving a pin of the initiator. When the pins of the initiator are received in the receptacles of the connector, the initiator and the connector become electrically connected. Two electrical wires extend from the connector. One electrical wire connects to each receptacle of the connector. The two electrical wires also connect to a control module. The control module communicates with the initiator via electrical signals that are transmitted through the electrical wires.

Since two electrical wires are associated with each restraint module in a vehicle, the wires of the known apparatus in total require a relatively large space. Additionally, the electrical wires associated with the restraint modules of the vehicle add weight to the vehicle.

SUMMARY OF THE INVENTION

The present invention is a vehicle occupant safety apparatus. The apparatus comprises a sensor for sensing a vehicle crash condition and generating a signal indicative of the crash condition. The apparatus also comprises a control module for receiving the signal from the sensor and generating a demand-to-fire signal if the crash condition is above a threshold level. The apparatus further comprises a plurality of restraint modules for, when actuated, helping to protect a vehicle occupant during a crash condition. Each restraint module has at least one initiator energizable to actuate the restraint module. A restraint communication bus is connected to the control module and transfers the demand-to-fire signal from the control module to the restraint modules. A connector is associated with each initiator for receiving the demand-to-fire signal from the control module. Each initiator and the associated connector collectively form a transformer. The demand-to-fire signal is inductively coupled to the initiator for actuating the restraint module.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
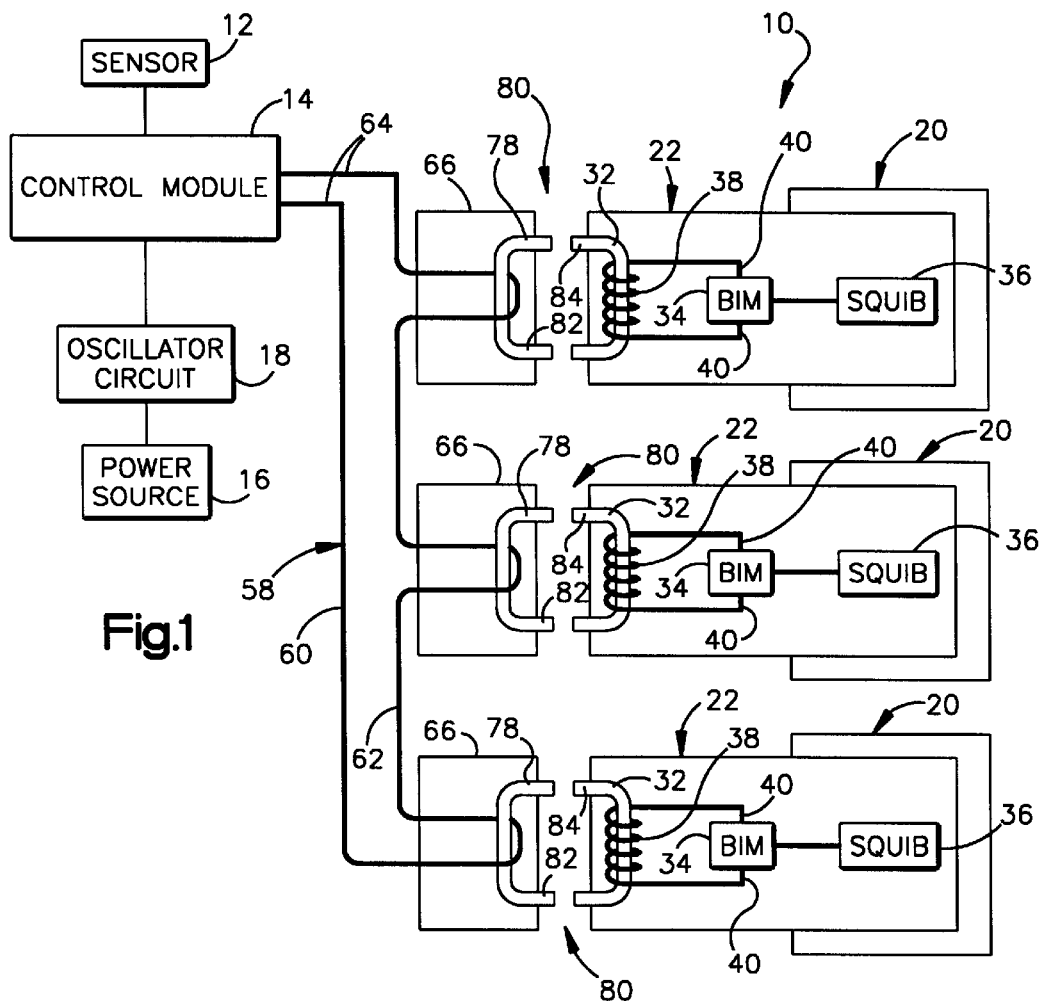
FIG. 1 is a diagrammatic representation of a vehicle occupant safety apparatus embodying the present invention.

FIG. 1 diagrammatically illustrates a vehicle occupant safety apparatus 10 embodying the present invention. The vehicle occupant safety apparatus 10 includes a sensor 12. The sensor 12 is a known device that senses a vehicle crash condition and, if a vehicle crash condition exists, generates a signal indicative of the crash condition. The sensor 12 may sense sudden vehicle deceleration, a rollover condition, or any other vehicle crash condition. FIG. 1 shows one sensor 12. Those skilled in the art will recognize that a plurality of sensors may be used in the vehicle occupant safety apparatus 10 of the present invention.

A control module 14 is electrically connected to a power source 16 and an oscillator circuit 18. The power source 16 is preferably the vehicle's DC battery. The oscillator circuit 18 generates a modulated alternating current signal. The modulated alternating current signal is used as a carrier, as will be discussed below. Preferably, the oscillator circuit 18 forms a portion of the control module 14.

The control module 14, preferably, includes a microprocessor. The control module 14 receives the signal indicative of the crash condition from the sensor 12 and determines if the crash condition is above a threshold level. If the crash condition is above a threshold level, the control module 14 generates a demand-to-fire signal for actuating at least one restraint module 20 of the vehicle occupant safety apparatus 10. The demand-to-fire signal sent by the control module 14 is carried by the modulated alternating current signal.

The vehicle occupant safety apparatus 10, as shown in FIG. 1, includes three actuatable restraint modules 20. The restraint modules 20 may be any known type of actuatable restraint module that, when actuated, helps to protect a vehicle occupant during a crash condition. Examples of known actuatable restraint modules 20 include inflatable vehicle occupant protection devices, such as an inflatable air bag, an inflatable seat belt, an inflatable knee bolster, an inflatable head liner, an inflatable side curtain, or a knee bolster operated by an inflatable air bag. The restraint modules 20 may also be non-inflatable vehicle occupant protection devices, such as a seat belt pretensioner.

Figure 2:
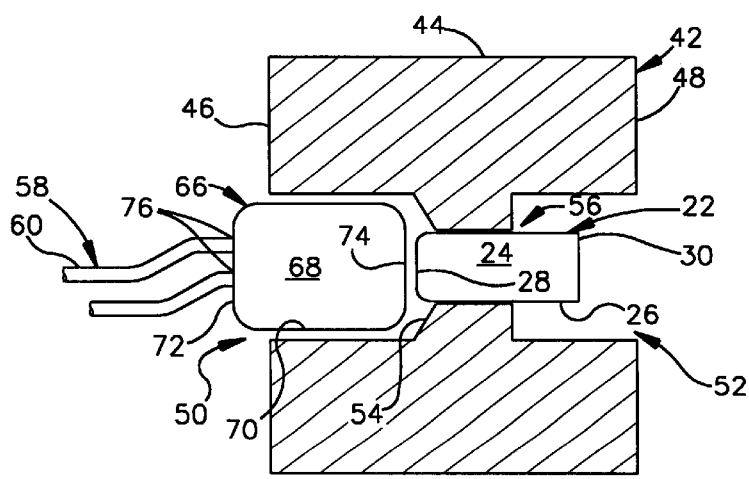
FIG. 2 is view of a retainer of the present invention in which an initiator and a connector are secured.
Figure 3:
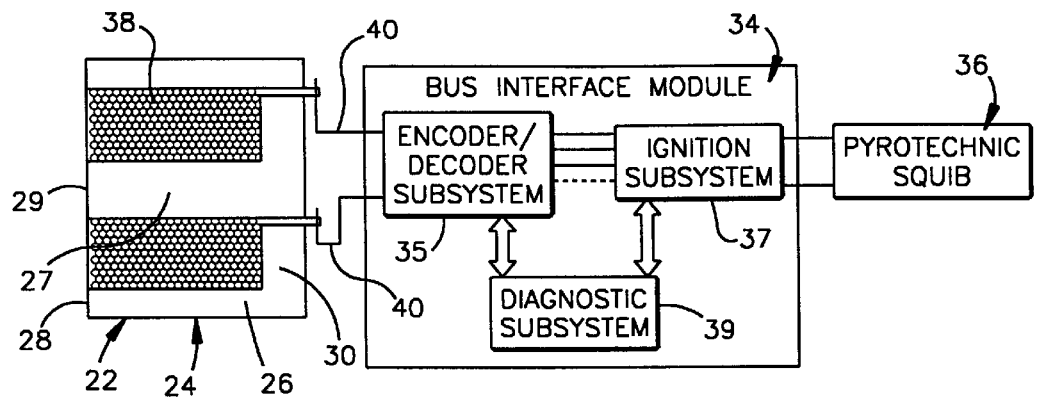
FIG. 3 is a schematic diagram of an initiator for use in the vehicle occupant safety apparatus of FIG. 1.

Each restraint module 20 has an electronic initiator 22 that is energizable to actuate the restraint module 20. As shown in FIGS. 2 and 3, each initiator 22 has a cylindrical main body portion 24. As shown in FIG. 3, the cylindrical main body portion 24 includes a tubular outer wall 26 that is coaxial with and surrounds a cylindrical inner wall 27. The tubular outer wall 26 includes an annular face 28 and the cylindrical inner wall includes a circular face 29 that is planar with face 28. A rear wall 30 connects the tubular outer wall 26 to the cylindrical inner wall 27. The tubular outer wall 26 of the initiator 22 includes means (not shown) for interlocking with a retainer 42 of the restraint module 20.

The main body portion 24 of the initiator 22 forms a core portion 32, as shown diagrammatically in FIG. 1. The core portion 32 of the initiator 22 is made from a ferrimagnetic material. The core portion 32 of the initiator 22 includes a north pole face and a south pole face. The north pole face is formed from either the face 28 of the tubular outer wall 26 or the face 29 of the cylindrical inner wall 27. The south pole face is formed from the other of the face 28 of the tubular outer wall 26 or the face 29 of the cylindrical inner wall 27.

A winding 38 is wrapped around the core portion 32 of the initiator 22. As shown in FIG. 3, the winding surrounds the cylindrical inner wall 27 of the initiator 22 and is surrounded by the tubular outer wall 26 of the initiator 22. Wires 40 from the winding 38 connect to a bus interface module 34, which electrically connected to a pyrotechnic squib 36.

As shown in FIG. 3, the bus interface module 34 includes electronic circuitry comprising an encoder/decoder subsystem 35, an ignition subsystem 37, and a diagnostic subsystem 39. The encoder/decoder subsystem 35 manages the exchange of information between the control module 14 and the initiator 22 and also controls the ignition subsystem 37. The ignition subsystem 37 preferably includes an energy storage capacitor (not shown) and a dissipative circuit element (not shown). The ignition subsystem 37 controls the charging and discharging of the capacitor. The capacitor can be discharged to either the dissipative circuit element or to the squib 36. When the capacitor is discharged to the dissipative circuit element, the initiator 22 becomes disarmed. When the capacitor is discharged to the squib 36, the pyrotechnic material within the squib 36 is ignited and the restraint module 20 is actuated. The diagnostic subsystem 39 monitors the state of the encoder/decoder subsystem 35 and the ignition subsystem 37 to ensure that the subsystems 35 and 37 are operating properly. In the event that a subsystem 35 and 37 is not operating properly, a signal can be sent by the encoder/decoder subsystem 35 to notify the control module 14 of the condition.

As shown in FIG. 2, each restraint module 20 includes a retainer 42. The retainer 42 is preferably formed from steel. For example, in an air bag module, the retainer 42 may be a portion of a reaction can of the air bag module.

The retainer 42 illustrated in FIG. 2 is cylindrical and includes a cylindrical side wall 44 and two axially opposite end walls 46 and 48. A first end wall 46 includes a centrally located, axially extending bore 50. The bore 50 extends into the first end wall 46 approximately one-half of the axial length of the retainer 42. The bore 50 in the first end wall 46 forms a socket for receiving a connector 66. The socket includes means (not shown) for engaging and securing the connector 66.

A second end wall 48 also includes a centrally located, axially extending bore 52. The bore 52 extends into the second end wall 48 approximately one-third of the axial length of the retainer 42.

Each bore 50 and 52 has approximately the same diameter. A wall 54 having a thickness of approximately one-sixth the axial length of the retainer 42 separates the two bores 50 and 52. A passageway 56, having a diameter that is approximately one-half the diameter of each bore 50 and 52, extends through the center of the wall 54. The passageway 56 connects the two bores 50 and 52 and is coaxial with the two bores 50 and 52. The passageway 56 includes means (not shown) for engaging and securing the initiator 22.

As shown in FIG. 1, the vehicle occupant safety apparatus 10 also includes a restraint communication bus 58. The restraint communication bus 58 links each restraint module 20 to the control module 14. The restraint communication bus 58 illustrated in FIG. 1 is a loop formed from a single wire 60. The wire 60 forming the restraint communication bus 58 is preferably an insulated copper wire having an intermediate portion 62 and opposite end portions 64.

Figure 4A:
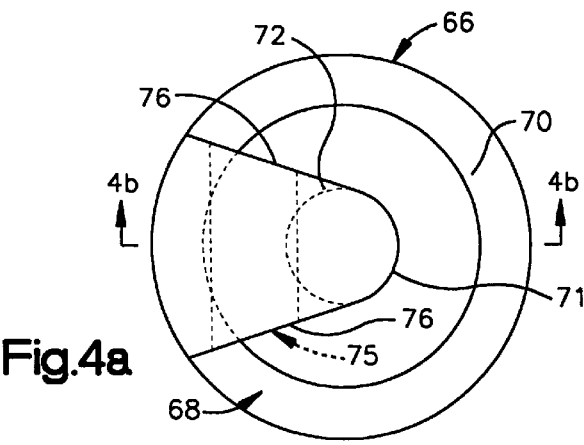
FIGS. 4(a)-4(b) are schematic illustrations of the connector for use in the vehicle occupant safety apparatus of FIG. 1.
Figure 4B:
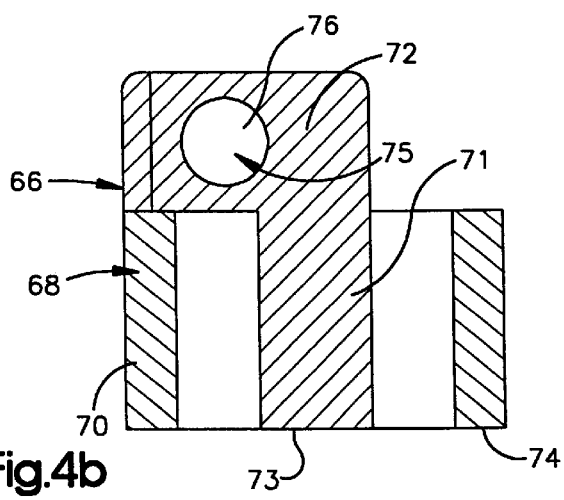

A connector 66 is associated with each initiator 22. The connector 66 is a coupling device for electrically connecting the restraint communication bus 58 to the initiator 22. FIGS. 4(a)-4(b) illustrate the connector 66. The connector 66 includes a cylindrical main body portion 68. The main body portion 68 of the connector 66 has a tubular outer wall 70 and a cylindrical inner wall 71 that is coaxial with and surrounded by the tubular outer wall 70. The diameter of the tubular outer wall 70 of the connector 66 is approximately twice the diameter of the tubular outer wall 26 of the initiator 22, as shown in FIG. 2. The tubular outer wall 70 of the connector 66 has an annular face 74 (FIG. 4(b)) and the cylindrical inner wall has a circular face 73 that is planar with face 74.

A rear wall 72 connects the cylindrical inner wall 71 to a portion of the tubular outer wall 70. A through hole 75 extends through the rear wall 72 for receiving the wire 60 of the restraint communication bus 58. Two circular ports 76 define the ends of the through hole 75 and provide access for the wire 60 of the restraint communication bus 58 into and out of the through hole 75.

The main body portion 68 of the connector 66 forms a core portion 78, shown diagrammatically in FIG. 1. The core portion 78 of the connector 66 is preferably made from a ferrimagnetic material. The core portion 78 of the connector 66 includes a north pole face and a south pole face. The north pole face is formed from either the face 74 of the tubular outer wall 26 or the face 73 of the cylindrical inner wall 71. The south pole face is formed from the other of the face 74 of the tubular outer wall 26 or the face 73 of the cylindrical inner wall 71. The north and south pole faces of the connector 66 correspond with the north and south pole faces of the initiator 22.

As shown in FIG. 1, the sensor 12 is electrically connected to the control module 14. The end portions 64 of the wire 60 forming the restraint communication bus 58 are connected to the control module 14 and the intermediate portion 62 of the wire 60 forms a loop throughout the vehicle that links the restraint modules 20 to the control module 14. The wire 60 forming the restraint communication bus 58 extends the through hole 75 in the rear wall 72 of each connector 66.

The initiator 22 of each restraint module 20 is received and secured in the passageway 56 of the retainer 42. When secured in the retainer 42, the rear wall 30 of the initiator 22 is away from the socket formed by bore 50 of the retainer 42. The connector 66 is received and secured in the socket formed by bore 50 of the retainer 42 such that the rear wall 72 of the connector 66 is away from the initiator 22. In this position, the pole faces 73 and 74 of the connector 66 are adjacent to the pole faces 28 and 29 of the initiator 22. When the connector 66 is in position adjacent the initiator 22, the core portion 78 of the connector 66 is aligned with the core portion 32 of the initiator 22. Since both the connector 66 and the initiator 22 are cylindrical with coaxial pole faces, the alignment of the pole faces 73 and 74 of the connector 66 with the pole faces 28 and 29 of the initiator 22 is not dependent upon the orientation of the connector 66 relative to the initiator 22. When the connector 66 and the initiator 22 are placed coaxial to and adjacent to one another, the pole faces 73 and 74 of the connector 66 automatically align with the pole faces 28 and 29 of the initiator 22. Thus, the connector 66 may be placed in the socket in any rotational orientation without affecting the performance of the apparatus 10.

It is noteworthy that the connector 66 is separable from the initiator 22 by removing the connector 66 from the retainer 42. Removing one connector 66 from the retainer 42 will disconnect the associated restraint module 20 from the restraint communication bus 58, but will not affect the operation of the other restraint modules 20 of the apparatus 10.

Preferably, when both the connector 66 and the initiator 22 are secured in the retainer 42, pole faces 73 and 74 of the connector 66 will contact and rest against the pole faces 28 and 29 of the initiator 22. However, to allow for tolerances in assembly of the restraint module 20, an air gap of preferably no more than 1.3 millimeters may extend between the pole faces 73 and 74 of the connector 66 and the pole faces 28 and 29 of the initiator 22.

When both the connector 66 and the initiator 22 are secured adjacent one another as shown in FIG. 2, they collectively form a transformer 80 (FIG. 1). The transformer 80 includes the core portion 32 of the initiator 22 and the core portion 78 of the connector 66. The core portion 78 of the connector 66 forms the primary core portion 82 of the transformer 80 and the core portion 32 of the initiator 22 forms the secondary core portion 84 of the transformer 80.

When the sensor 12 senses a crash condition, the sensor 12 generates a signal indicative of the crash condition. The sensor 12 sends the signal to the control module 14. After receiving the signal from the sensor 12, the control module 14 determines if the crash condition is above a threshold level. If the crash condition is above the threshold level, the control module 14 generates a demand-to-fire signal for actuating the restraint modules 20 of the vehicle. The control module 14 sends the demand-to-fire signal to the restraint modules 20 through the restraint communication bus 58. The demand-to-fire signal is preferably frequency shift keyed onto the modulated alternating current signal and is sent through the restraint communication bus 58.

A magnetic flux is created between the primary and secondary core portions 82 and 84 of each transformer 80 when the modulated alternating current signal passes through the through hole 75 in the rear wall 72 of the connector 66. The magnetic flux induces an electrical current in the winding 38 of the initiator 22. The current induced in the initiator winding 38 is input into the bus interface module 34 of the initiator 22. The encoder/decoder subsystem 35 demodulates and rectifies the induced current and deciphers the demand-to-fire signal. The encoder/decoder subsystem 35 of the bus interface module 34 then determines if the restraint module 20 should be actuated.

Each initiator 22 may be pre-programmed with a bus address, preferably a binary bus address. To actuate a respective initiator 22, the demand-to-fire signal produced by the control module 14 must include the binary bus address that corresponds with the binary bus address of the respective initiator 22. If the demand-to-fire signal does not include the corresponding binary bus address for the respective initiator 22, the demand-to-fire signal will not actuate the respective initiator 22.

By assigning the initiator 22 a bus address, the initiator 22 is protected against accidental firing by stray magnetic fields or signals. Additionally, the control module 14 can selectively and sequentially actuate the restraint modules 20 in the vehicle. For example, by using different bus addresses for the initiators 22 of a seat belt pretensioner and an inflatable air bag, the control module 14 may send a first demand-to-fire signal to actuate the seat belt pretensioner and then, at a later time, if desired, send a second demand-to-fire signal to actuate the inflatable air bag.

If the encoder/decoder subsystem 35 of a particular restraint module 20 determines that the restraint module 20 should be actuated, the capacitor of the ignition subsystem 37 of the bus interface module 34 of the initiator 22 is discharged and electrical energy is sent to the squib 36. The electrical energy causes the squib 36 to fire, which, in turn, actuates the restraint module 20. If the encoder/decoder subsystem 35 determines that the restraint module 20 should not be actuated, the capacitor is not discharged and the initiator 22 remains in a ready state.

Those skilled in the art will recognize that the ignition subsystem 37 of the bus interface module 34 of the initiator 22 does not require a capacitor, but instead may have a direct electrical connection. The capacitor is an energy source within the initiator 22. The capacitor allows the initiator to be charged using low amperage current and allows the initiator 22 to be fired without receiving a high amperage demand-to-fire signal.

Figure 5:
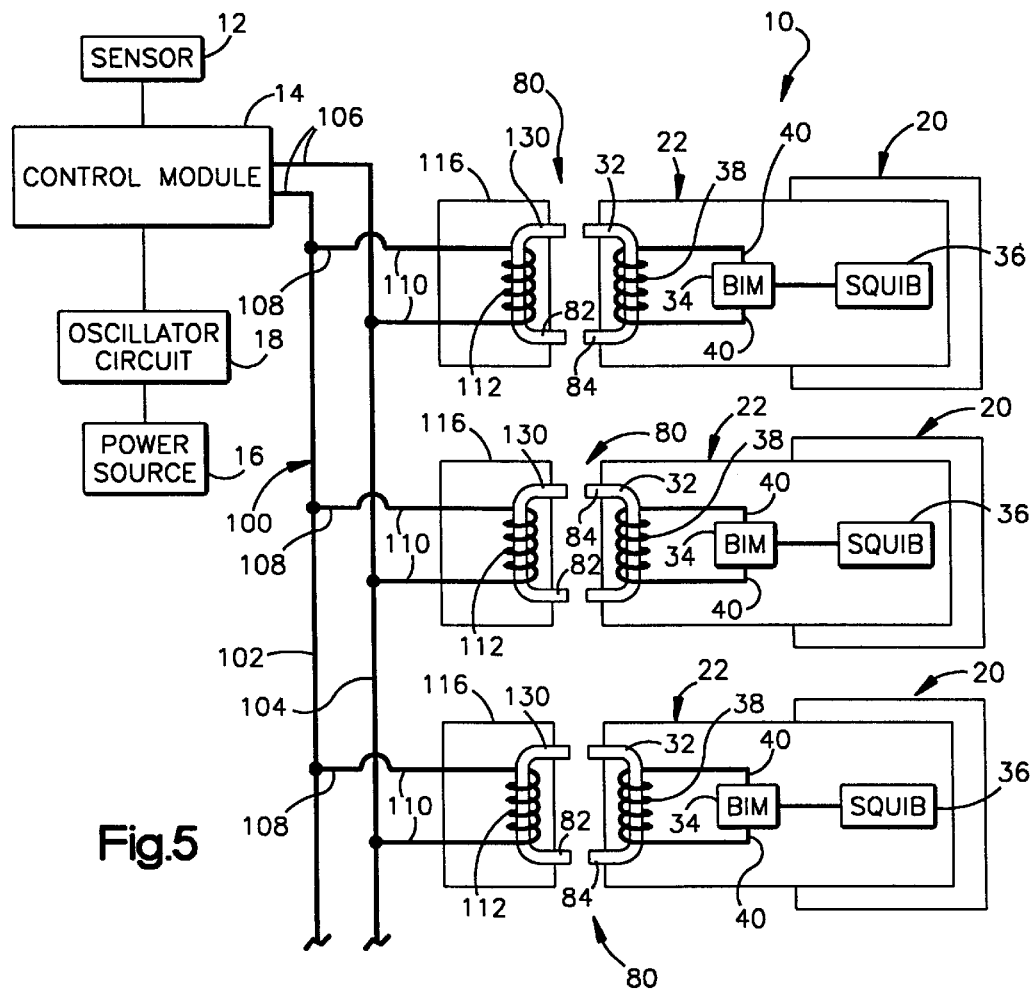
FIG. 5 is a diagrammatic representation of a second embodiment of a vehicle occupant safety apparatus embodying the present invention.

A second embodiment of a vehicle occupant safety apparatus 10 embodying the present invention is illustrated in FIG. 5. Like the embodiment of FIG. 1, the apparatus 10 of the second embodiment includes a sensor 12, a control module 14, a restraint communication bus 100, a connector 116, an initiator 22, and a retainer 42.

The sensor 12, control module 14, initiator 22, and retainer 42 of the second embodiment of the apparatus 10 are identical to those described with regard to FIGS. 1 and 2. Accordingly, the same reference numbers will be used to indicate similar items, and the description of the second embodiment will focus on the restraint communication bus 100 and the connector 116.

Figure 6:
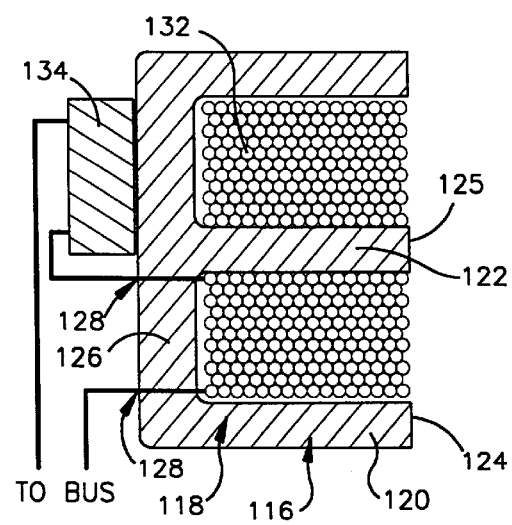
FIG. 6 is a schematic illustration of a connector for use in the vehicle occupant safety apparatus of FIG. 5.

The connector 116 is illustrated in FIG. 6. The connector 116 has a cylindrical main body portion 118. The main body portion includes a tubular outer wall 120 and a cylindrical inner wall 122 that is coaxial with the tubular outer wall 120. The tubular outer wall 120 has an annular face 124 and the cylindrical inner wall 122 has a circular face 125 that is planar with face 124. A rear wall 126 connects the tubular outer wall 120 to the cylindrical inner wall 122. Two through holes 128 extend through the rear wall 126 of the connector 116.

The main body portion 118 of the connector 116 defines a core portion 130, shown diagrammatically in FIG. 5. The core portion 130 includes a north pole face and a south pole face. Either the face 124 of the tubular outer wall 120 or the face 125 of the cylindrical inner wall 122 forms the north pole face of the core portion 130. The other of the face 124 of the tubular outer wall 120 or the face 125 of the cylindrical inner wall 122 forms the south pole face of the core portion 130.

The restraint communication bus 100 illustrated in FIG. 5 includes a first bus wire 102 and a second bus wire 104. Preferably, each wire 102 and 104 is an insulated copper wire. One end 106 of each bus wire 102 and 104 is connected to the control module 14. The remaining portion of each bus wire 102 and 104 extends throughout the vehicle to link the restraint modules 20 to the control module 14.

A connector wire 108 extends from the restraint communication bus 100 in the location of each connector 116. The connector wire 108 includes opposite end portions 110 and a central portion 112. One end portion 110 of the connector wire 108 is electrically connected to the first bus wire 102. A second end portion 110 of the connector wire 108 is electrically connected to the second bus wire 104.

The central portion 112 of the connector wire 108 extends into the respective connector 116 forms a winding 132. The winding 132 surrounds the cylindrical inner wall 122 of the connector 116 and is surrounded by the tubular outer wall 120 of the connector 116. The connector wire 108 extends through the through holes 128 in the rear wall 126 of the connector 116 to form the winding 132. In this arrangement, the connectors 116 that are linked by the restraint communication bus 100 are wired in parallel connection to one another.

As shown in FIG. 6, the connector 116 may include a capacitor 134. FIG. 6 illustrates a chip capacitor 134 that is wired in series with connector wire 108. The capacitor 134 is used as an energy storage device.

As shown in FIG. 5, a transformer 80 is formed from the core portion 130 of the connector 116 and the core portion 32 of the initiator 22. The core portion 130 of the connector 116 forms the primary core portion 82 of the transformer 80 and the core portion 32 of the initiator 22 forms the secondary core portion 84 of the transformer 80.

When the sensor 12 senses a crash condition, a sensor signal indicative of the crash condition is sent to the control module 14. If the control module 14 determines that the crash condition is above a threshold level, the control module 14 generates a demand-to-fire signal. The demand-to-fire signal is carried on a modulated alternating current signal. The demand-to-fire signal is sent through the restraint communication bus 100. The modulated alternating current signal passes through each connector wire 108 that is wound around the primary core portion 82 of a transformer 80. The modulated alternating current signal creates a magnetic flux in the primary and the secondary core portions 82 and 84 of the transformer 80. The magnetic flux induces a current in the winding 38 of the initiator 22. The initiator 22 operates in the same manner as the initiator 22 described with reference to FIGS. 1 and 2.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant safety apparatus comprising:
   a sensor for sensing a vehicle crash condition and generating a signal indicative of the crash condition;
   a control module for receiving the signal from the sensor and generating a demand-to-fire signal if the crash condition is above a threshold level;
   a plurality of restraint modules for, when actuated, helping to protect a vehicle occupant during a crash condition, each restraint module having at least one initiator that is energizable to actuate the restraint module;
   a restraint communication bus connected to the control module and transferring the demand-to-fire signal from the control module to the restraint modules; and
   a connector associated with each initiator for receiving the demand-to-fire signal from the control module,
   each initiator and the associated connector collectively forming a transformer, the demand-to-fire signal being inductively coupled to the initiator for actuating the restraint module.

2. A vehicle occupant safety apparatus comprising:
   a sensor for sensing a vehicle crash condition and generating a signal indicative of the crash condition;
   a control module for receiving the signal from the sensor and generating a demand-to-fire signal if the crash condition is above a threshold level;
   a plurality of restraint modules for, when actuated, helping to protect a vehicle occupant during a crash condition, each restraint module having at least one initiator that is energizable to actuate the restraint module;
   a restraint communication bus connected to the control module and transferring the demand-to-fire signal from the control module to the restraint modules; and
   a connector associated with each initiator for receiving the demand-to-fire signal from the control module,
   each initiator and the associated connector collectively forming a transformer, the demand-to-fire signal being inductively coupled to the initiator for actuating the restraint module,
   the connector including a primary core portion of the transformer and the initiator including a secondary core portion of the transformer; and
   the initiator and the associated connector being mechanically separable.

3. The vehicle occupant safety apparatus of claim 2 further being defined by:
   the initiator further including a bus interface module that is electrically connected to a pyrotechnic squib; and
   at least one initiator wire connecting the secondary core portion of the transformer to the bus interface module.

4. The vehicle occupant safety apparatus of claim 3 further being defined by:
   the initiator wire forming a winding that wraps around the secondary core portion of the transformer.

5. The vehicle occupant safety apparatus of claim 3 further being defined by:
   the restraint communication bus being a loop of a single wire;
   opposite ends of the restraint communication bus connecting to the control module; and
   the restraint communication bus passing between the primary and the secondary core portions of each transformer.

6. The vehicle occupant safety apparatus of claim 5 further being defined by:
   the restraint communication bus being physically separated from both the primary and secondary core portions of the transformer when passing between the respective core portions.

7. The vehicle occupant safety apparatus of claim 6 further being defined by:
   the primary core portion and the secondary core portion being a ferromagnetic material.

8. The vehicle occupant safety apparatus of claim 2 further being defined by:
   each restraint module having a retainer, the retainer having a passageway for securing the initiator and a socket for receiving and securing the associated connector; and
   when both the initiator and the associated connector are secured in the retainer, a face of the initiator being adjacent a face of the associated connector.

9. The vehicle occupant safety apparatus of claim 8 further being defined by:
   an air gap of up to 1.3 millimeters separating the face of the initiator and the face of the connector when both the initiator and the connector are secured in the retainer.

10. The vehicle occupant safety apparatus of claim 2 further being defined by:
    the restraint communication bus being a loop of two wires;
    an end of each wire being connected to the control module; and
    the two wires being connected to form a winding that wraps around the primary core portion of each transformer.

11. The vehicle occupant safety apparatus of claim 10 further being defined by:

the transformers being connected in parallel by the two wires.

12. The vehicle occupant safety apparatus of claim 11 further being defined by:

the initiator further including a bus interface module that is electrically connected to a pyrotechnic squib;

at least one initiator wire connecting the secondary core portion to the bus interface module; and the initiator wire forming a winding that wraps around the secondary core portion of the transformer.

13. The vehicle occupant safety apparatus of claim 1 further being defined by:

each initiator having a bus address;

the initiator being actuated upon receipt of the demand-to-fire signal when the demand-to-fire includes a corresponding bus address;

the initiator not being actuated upon receipt of the demand-to-fire signal when the demand-to-fire signal does not include the corresponding bus address.

14. The vehicle occupant safety apparatus of claim 13 further being defined by:

the bus address being a pre-programmed binary number;

the control module producing demand-to-fire signals including binary number bus addresses to selectively and sequentially actuate the restraint modules.

15. A vehicle occupant safety apparatus comprising:

a sensor for sensing a vehicle crash condition and generating a signal indicative of the crash condition;

a control module for receiving the signal from the sensor and generating a demand-to-fire signal if the crash condition is above a threshold level;

a plurality of restraint modules for, when actuated, helping to protect a vehicle occupant during a crash condition, each restraint module having at least one initiator that is energizable to actuate the restraint module;

a restraint communication bus connected to the control module and transferring the demand-to-fire signal from the control module to the restraint modules; and a connector associated with each initiator for receiving the demand-to-fire signal from the control module, each initiator and the associated connector collectively forming a transformer, the demand-to-fire signal being inductively coupled to the initiator for actuating the restraint module, each initiator having a bus address;

the initiator being actuated upon receipt of the demand-to-fire signal when the demand-to-fire includes a corresponding bus address;

the initiator not being actuated upon receipt of the demand-to-fire signal when the demand-to-fire signal does not include the corresponding bus address, the bus address being frequency shift keyed onto a modulated alternating current signal.

* * * * *